United States Patent
Fukushima et al.

(10) Patent No.: US 11,810,338 B2
(45) Date of Patent: Nov. 7, 2023

(54) MACHINE LEARNING MODEL FOR IMAGE RECOGNITION USED IN AUTONOMOUS VEHICLES

(71) Applicant: TOYOTA JIDOSHA KABUSHIKI KAISHA, Toyota (JP)

(72) Inventors: Shintaro Fukushima, Tokyo (JP); Takeyuki Sasai, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 214 days.

(21) Appl. No.: 17/232,405

(22) Filed: Apr. 16, 2021

(65) Prior Publication Data
US 2021/0331693 A1    Oct. 28, 2021

(30) Foreign Application Priority Data
Apr. 23, 2020    (JP) .................................. 2020-076792

(51) Int. Cl.
*G06N 20/00*    (2019.01)
*G06T 7/00*    (2017.01)
(Continued)

(52) U.S. Cl.
CPC ......... *G06V 10/764* (2022.01); *B60W 60/001* (2020.02); *G06F 18/214* (2023.01);
(Continued)

(58) Field of Classification Search
CPC .......... B60W 60/001; B60W 2420/403; G06V 10/764; G06V 10/7747; G06V 10/82; G06V 10/774; G06V 20/56; G06F 18/214
See application file for complete search history.

(56) References Cited

U.S. PATENT DOCUMENTS 10,074,281 B2    9/2018    Pandita et al.
10,515,278 B2    12/2019    Ide
(Continued)

FOREIGN PATENT DOCUMENTS

CN    110889804 A    3/2020

OTHER PUBLICATIONS

Weiming Xiang et al., "Reachable Set Computation and Safety Verification for Neural Networks with ReLU Activations", arXiv:1712.08163v1 [cs.LG] Dec. 21, 2017, Dec. 25, 2017, pp. 1-19.

(Continued)

*Primary Examiner* — Jess Whittington
*Assistant Examiner* — Rami Nabih Bedewi
(74) *Attorney, Agent, or Firm* — Sughrue Mion, PLLC

(57) ABSTRACT

An information processing device includes a first determination section and a first output section. First output data is obtained from a trained model, which has being trained beforehand, by input of first input data to the trained model. Second output data is obtained from the trained model by input of second input data to the trained model, in which second input data a perturbation of a specified perturbation amount is applied to the first input data. The first determination section makes a determination as to whether a change amount of the second output data relative to the first output data is not more than a pre-specified threshold. The first output section outputs information representing the first input data and a perturbation amount for which the change amount is determined by the first determination section to be not more than the threshold.

11 Claims, 7 Drawing Sheets

(51) Int. Cl.
  *G06V 10/764* (2022.01)
  *G06V 10/774* (2022.01)
  *B60W 60/00* (2020.01)
  *G06V 20/56* (2022.01)
  *G06F 18/214* (2023.01)
  *G06V 10/82* (2022.01)

(52) U.S. Cl.
  CPC ........ *G06V 10/774* (2022.01); *G06V 10/7747* (2022.01); *G06V 10/82* (2022.01); *G06V 20/56* (2022.01); *B60W 2420/403* (2013.01)

(56) References Cited

U.S. PATENT DOCUMENTS

| | | | |
|---|---|---|---|
| 10,692,369 | B2 | 6/2020 | Endo |
| 10,814,880 | B2 | 10/2020 | Kishi |
| 10,864,852 | B2 | 12/2020 | Morimura et al. |
| 10,957,188 | B2 | 3/2021 | Johnson et al. |
| 10,974,732 | B2 | 4/2021 | Vladimerou |
| 11,205,342 | B2 | 12/2021 | Ikemoto et al. |
| 11,231,285 | B2 | 1/2022 | Hokai et al. |
| 11,270,136 | B2 | 3/2022 | Yanagi et al. |
| 11,307,595 | B2 * | 4/2022 | Lim ........................ G06T 7/593 |
| 2016/0127616 | A1 * | 5/2016 | Seshadrinathan ....... G06T 5/007 |
| | | | 348/241 |
| 2018/0253866 | A1 * | 9/2018 | Jain .......................... G06N 7/01 |
| 2019/0359227 | A1 | 11/2019 | Otaki et al. |
| 2020/0082197 | A1 | 3/2020 | Alletto et al. |
| 2020/0172114 | A1 | 6/2020 | Hamagami et al. |
| 2020/0302287 | A1 * | 9/2020 | Tachibana ............ G06V 10/776 |
| 2021/0133976 | A1 * | 5/2021 | Carmi ................... G16H 30/20 |
| 2021/0319315 | A1 * | 10/2021 | Hutmacher .......... G05B 13/027 |
| 2022/0222580 | A1 * | 7/2022 | Yokota .................. G06N 20/00 |

OTHER PUBLICATIONS

Christian Szegedy, et al., "Intriguing properties of neural networks", arXiv: 1312.6199v4 [cs.CV] Feb. 19, 2014, pp. 1-10.
Eric Wong, et al., "Provable Defenses against Adversarial Examples via the Convex Outer Adversarial Polytope", arXiv:1711.00851v3 [cs.LG] Jun. 8, 2018, pp. 1-19.

* cited by examiner

MACHINE LEARNING MODEL FOR IMAGE RECOGNITION USED IN AUTONOMOUS VEHICLES

CROSS-REFERENCE TO RELATED APPLICATION

This application is based on and claims priority under 35 USC § 119 from Japanese Patent Application No. 2020-076792 filed on Apr. 23, 2020, the disclosure of which is incorporated by reference herein.

TECHNICAL FIELD

The present disclosure relates to an information processing system.

RELATED ART

Xiang, Tran and Johnson, Reachable Set Computation and Safety Verification for Neural Networks with ReLU Activations (arXiv2017) (Non-Patent Document 1) discloses a technology that employs a neural network to precisely identify ranges of output data of a trained model, which has been trained beforehand, that correspond with input data to the trained model.

In the technology recited in Non-Patent Document 1, computational complexity is very large, which is not practical. Therefore, there is scope for improvement in regard to reducing the computational complexity. Furthermore, the technology recited in Non-Patent Document 1 does not evaluate the reliability of output data obtained by inputting data to the trained model.

SUMMARY

The present disclosure is made in consideration of the circumstances described above, and relates to both reducing computational complexity and enabling an evaluation of the reliability of output data obtained by inputting data to a trained model.

An information processing system according to a first aspect includes an information processing device and a control device. The information processing device includes: a first determination section that makes a determination as to whether a change amount of second output data relative to first output data is not more than a pre-specified threshold, the first output data being obtained from a trained model by input of first input data to the trained model, the trained model being trained beforehand, and the second output data being obtained from the trained model by input of second input data to the trained model, in which second input data a perturbation of a specified perturbation amount is applied to the first input data; and a first output section that outputs information representing the first input data and a perturbation amount for which the change amount is determined by the first determination section to be not more than the threshold. The control device includes: an acquisition section that acquires third input data to be inputted to the trained model; a second determination section that makes a determination as to whether the third input data is contained in a range represented by the information outputted by the first output section, the range being the perturbation amount measured from the first input data; and a second output section that outputs the third input data when the third input data is determined by the second determination section to be not contained in the range. The first determination section makes the determination thereof with the third input data outputted by the second output section serving as the first input data, and the first output section outputs the third input data and a perturbation amount for which the change amount is determined by the first determination section to be not more than the threshold.

According to the information processing system according to the first aspect, the trained model has been trained beforehand. The first output data is obtained from the trained model by input of the first input data to the trained model. A perturbation of a specified perturbation amount is applied to the first input data to obtain the second input data, and the second output data is obtained from the trained model by input of the second input data to the trained model. The information processing device makes a determination as to whether a change amount of the second output data relative to the first output data is at most the pre-specified threshold. The information processing device then outputs information representing the first input data and a perturbation amount for which the change amount is judged to be less than or equal to the threshold. The control device makes a determination as to whether the third input data to be inputted to the trained model is in the range that is the perturbation amount measured from the first input data, which are represented by the information outputted by the first output section. Then, if the third input data is judged to be not contained in this range, the control device outputs the third input data. The information processing device then carries out the determination described above, using the third input data outputted by the control device as the first input data. When the change amount is determined to be less than or equal to the threshold, the information processing device further outputs information representing the third input data and the perturbation amount for which this determination is made.

Thus, both computational complexity may be reduced and the reliability of output data obtained by inputting data to the trained model may be evaluated.

In an information processing system according to a second aspect, in the information processing system according to the first aspect, the first determination section repeats processing until the change amount is not more than the threshold, the processing including, when the change amount exceeds the threshold, reducing the perturbation amount from the preceding value thereof, obtaining new the second output data with the reduced perturbation amount, and making a determination as to whether the change amount of the obtained second output data relative to the first output data is not more than the threshold.

According to the information processing system according to the second aspect, because the determination is repeated until the change amount is less than or equal to the threshold, the reliability of output data obtained by inputting data to the trained model may be evaluated accurately.

In an information processing system according to a third aspect, in the information processing system according to the first aspect or second aspect, the first output section represents the first input data as a point in a space with the same number of dimensions as the first input data and outputs, as the information, a hypersphere centered on the point whose radius is the perturbation amount.

According to the information processing system according to the third aspect, because the first input data and the perturbation amount are represented as a hypersphere, the information representing the first input data and perturbation amount may be easy to handle.

In an information processing system according to a fourth aspect, in the information processing system according to any one of the first to third aspects, the information processing device includes a server computer, the control device includes a computer mounted at a vehicle, and the first input data, second input data and third input data are image data.

In an information processing system according to a fifth aspect, in the information processing system according to any one of the first to fourth aspects, the acquisition section acquires image data imaged by a camera mounted at the vehicle to serve as the first input data.

In an information processing system according to a sixth aspect, in the information processing system according to any one of the first to fifth aspects, the information outputted by the first output section is used in conducting autonomous driving control.

According to various aspects of the present disclosure, both computational complexity may be reduced and the reliability of output data obtained by inputting data to a trained model may be evaluated.

DETAILED DESCRIPTION

Herebelow, an exemplary embodiment of the present disclosure is described in detail with reference to the attached drawings.

Figure 1:
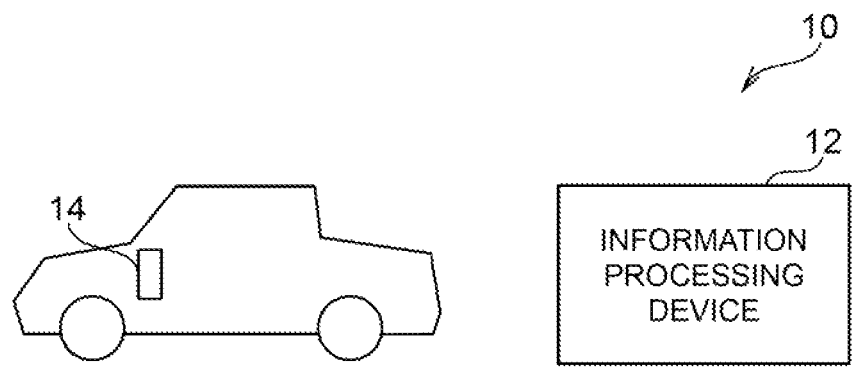
FIG. 1 is a block diagram showing an example of structures of an information processing system.

First, structures of an information processing system 10 according to the present exemplary embodiment are described with reference to FIG. 1. As shown in FIG. 1, the information processing system 10 includes an information processing device 12 and a control device 14. The information processing device 12 is employed in a testing phase. A server computer or the like can be mentioned as an example of the information processing device 12. The control device 14 is provided in a vehicle and is employed in an operation phase. An on-board computer such as an electronic control unit (ECU) or the like can be mentioned as an example of the control device 14.

Figure 2:
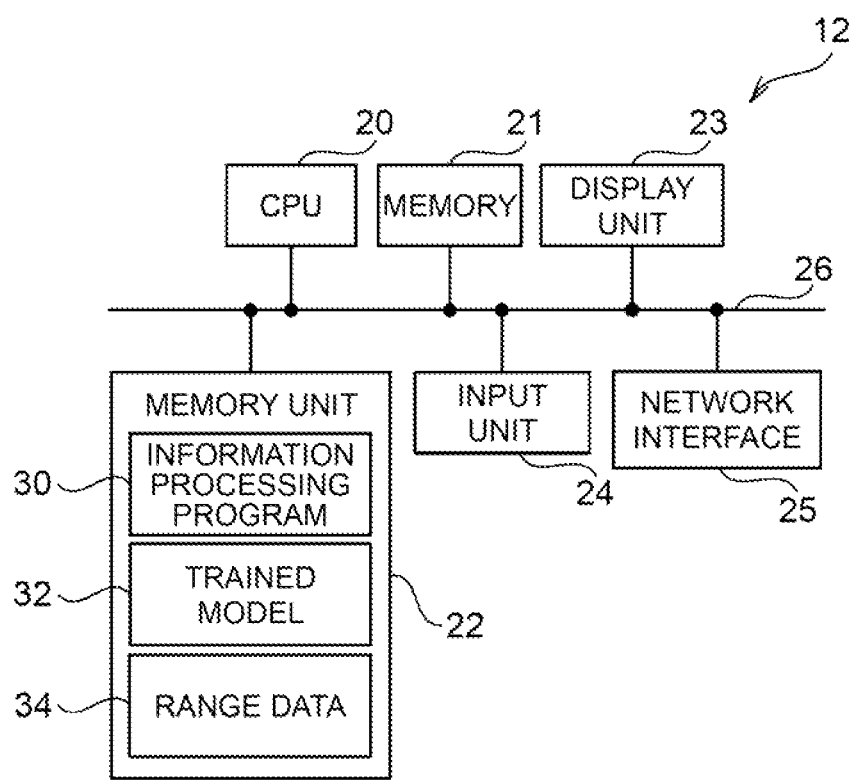
FIG. 2 is a block diagram showing an example of hardware structures of an information processing device.

Now, hardware structures of the information processing device 12 according to the present exemplary embodiment are described with reference to FIG. 2. As shown in FIG. 2, the information processing device 12 includes a central processing unit (CPU) 20, a memory 21 that serves as a temporary storage area, and a nonvolatile memory unit 22. The information processing device 12 further includes a display unit 23 such as a liquid crystal display or the like, an input unit 24 such as a keyboard and mouse or the like, and a network interface (I/F) 25 that is connected to a network. The CPU 20, memory 21, memory unit 22, display unit 23, input unit 24 and network interface 25 are connected to a bus 26.

The memory unit 22 is embodied by a hard disk drive (HDD), a solid state drive (SSD), a flash memory or the like. An information processing program 30 is memorized in the memory unit 22 serving as a memory medium. The CPU 20 reads the information processing program 30 from the memory unit 22, loads the information processing program 30 into the memory 21, and executes the loaded information processing program 30.

Figure 3:
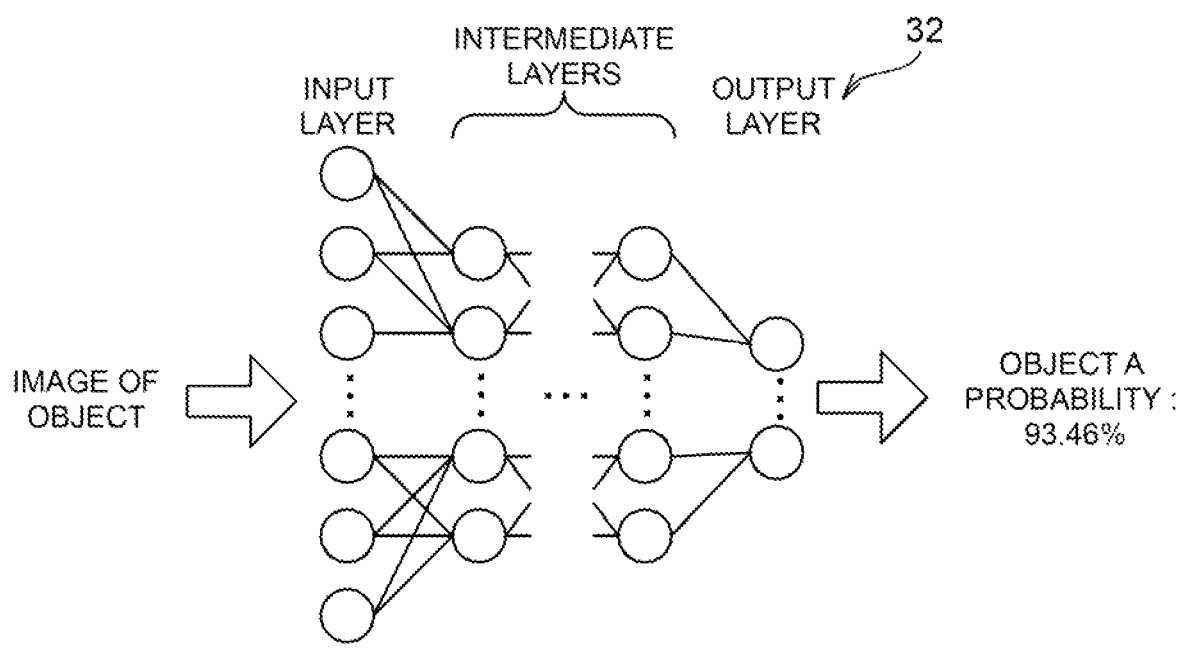
FIG. 3 is a diagram for describing a trained model.

A trained model 32 and range data 34 are memorized in the memory unit 22. The trained model 32 is a model that has been trained beforehand by machine learning. The trained model 32 is used for identifying objects appearing in images, which are input data. As in the example illustrated in FIG. 3, the trained model 32 according to the present exemplary embodiment is a deep neural network model including a single input layer, plural intermediate layers, and a single output layer. An image of an object is inputted to the trained model 32 and, in response to this input, an identification result for the object appearing in the image and a probability of the identification result are outputted. Road signs, traffic signals, vehicles, people and so forth can be mentioned as examples of objects. Note that the trained model 32 is not limited to being a deep neural network model. Details of the range data 34 are described below.

Figure 4:
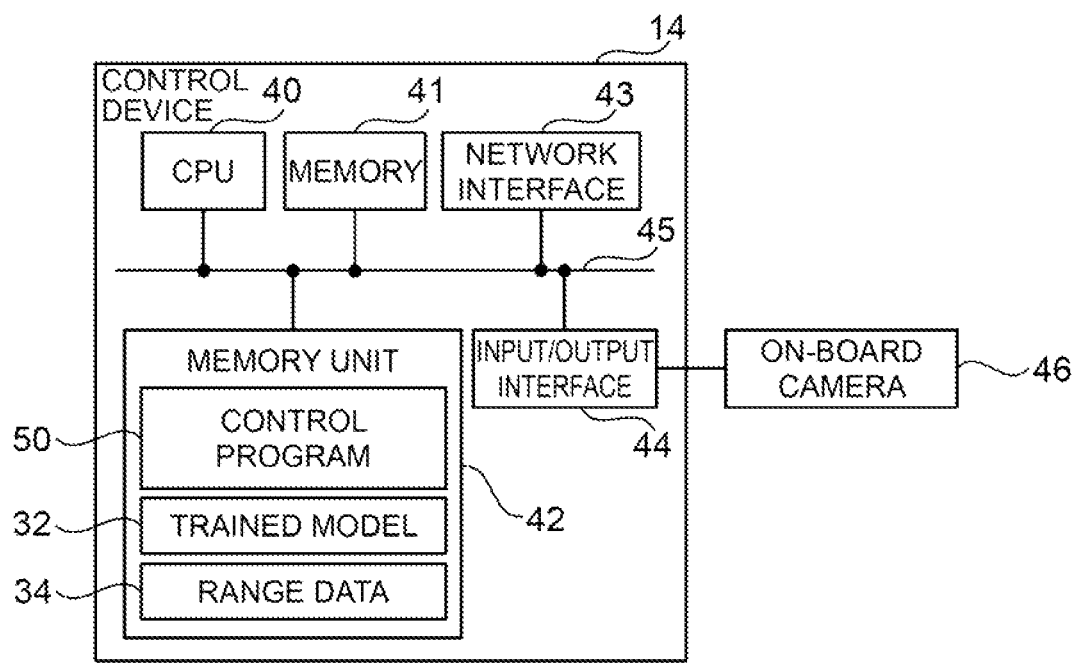
FIG. 4 is a block diagram showing an example of hardware structures of a control device.

Now, hardware structures of the control device 14 according to the present exemplary embodiment are described with reference to FIG. 4. As shown in FIG. 4, the control device 14 includes a CPU 40, a memory 41 that serves as a temporary storage area, and a nonvolatile memory unit 42. The control device 14 further includes a network interface 43 that is connected to the network, and an input/output interface 44. An on-board camera 46 is connected to the input/output interface 44. The CPU 40, memory 41, memory unit 42, network interface 43 and input/output interface 44 are connected to a bus 45.

The memory unit 42 is embodied by an HDD, SSD, flash memory or the like. A control program 50 is memorized in the memory unit 42 serving as a memory medium. The CPU 40 reads the control program 50 from the memory unit 42, loads the control program 50 into the memory 41, and executes the loaded control program 50. Similarly to the memory unit 22, the trained model 32 and the range data 34 are also memorized in the memory unit 42.

The on-board camera 46 is mounted in a cabin of the vehicle, images forward of the vehicle, and outputs obtained images to the control device 14.

Figure 5:
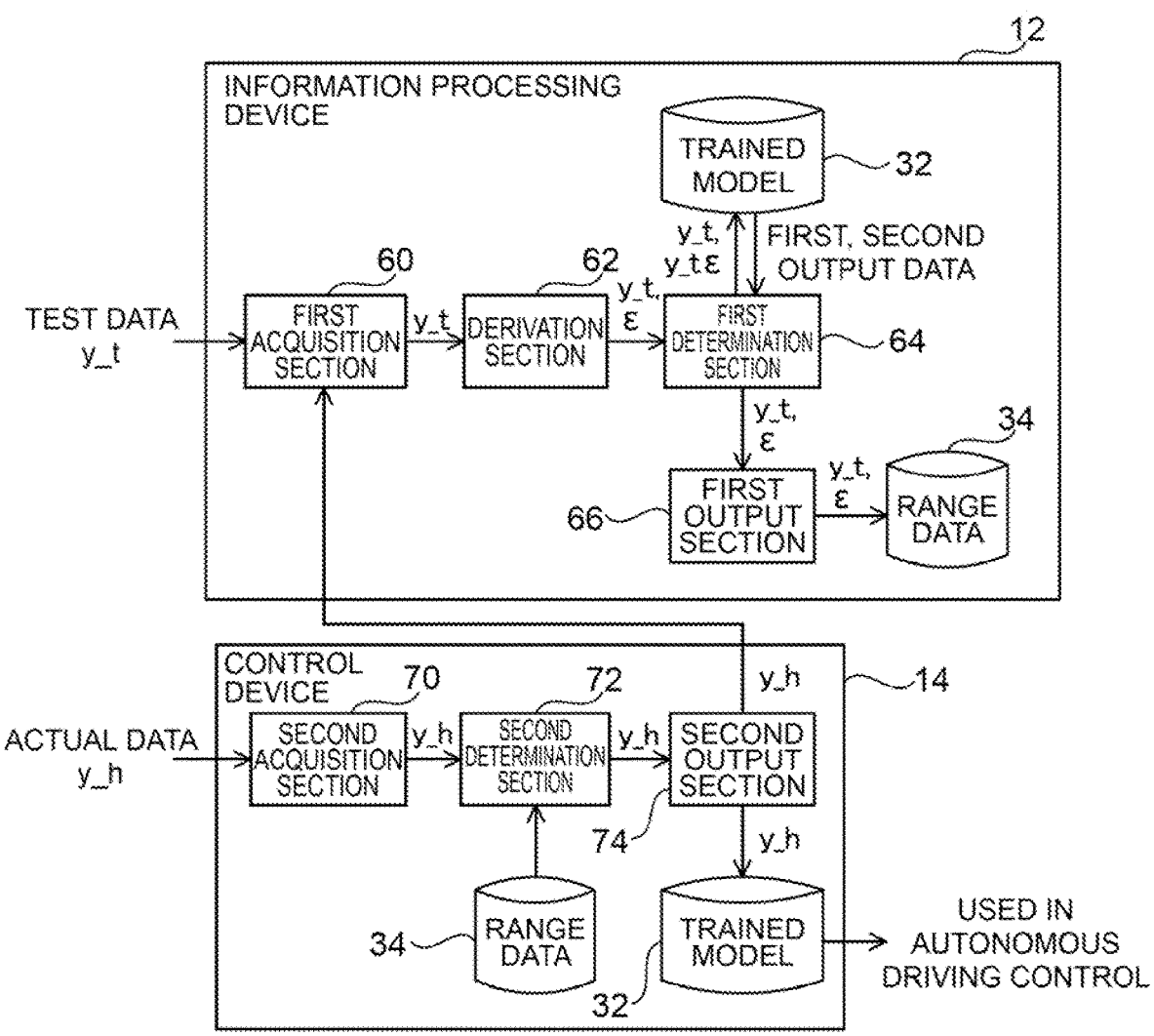
FIG. 5 is a block diagram showing an example of functional structures of the information processing device and control device.

Now, functional structures of the information processing device 12 and control device 14 according to the present exemplary embodiment are described with reference to FIG. 5. As shown in FIG. 5, the information processing device 12 includes a first acquisition section 60, a derivation section 62, a first determination section 64 and a first output section 66. By executing the information processing program 30, the CPU 20 of the information processing device 12 functions as the first acquisition section 60, the derivation section 62, the first determination section 64 and the first output section 66. The control device 14 includes a second acquisition section 70, a second determination section 72 and a second output section 74. By executing the control program 50, the CPU 40 of the control device 14 functions as the second acquisition section 70, the second determination section 72 and the second output section 74.

The first acquisition section 60 acquires test data y_t. The test data y_t according to the present exemplary embodiment is image data imaged by an imaging device, such as an on-board camera or the like, in which an object appears. The test data y_t corresponds to the first input data relating to the technology of the disclosure.

The derivation section 62 derives a perturbation amount ε of a perturbation to be applied to the test data y_t. More specifically, the derivation section 62 uses a technique recited in the below-mentioned Reference Document 1 to derive a perturbation amount ε that is a very small (for example a minimum) amount among perturbations to the test data y_t that cause changes with change amounts exceeding a threshold TH, which are described below. Examples of the perturbation referred to herein that can be mentioned include: deciding a maximum value for change amounts of several pixels in an image and changing pixel values; deciding a maximum value for an absolute value of an average of pixel values or a variance value of pixel values and applying white noise to an image; and so forth. In many cases, the maximum value corresponds to the perturbation amount ε herein.

Reference Document 1: Szegedy, Zaremba, Sutskever, Bruna, Ethan, Goodfellow and Fergus, Intriguing properties of neural networks, (ICLR2013).

The first determination section 64 inputs the test data y_t to the trained model 32 and hence obtains first output data from the trained model 32. The first determination section 64 further inputs test data y_tε, in which a perturbation of the perturbation amount ε is applied to the test data y_t, to the trained model 32 and hence obtains second output data from the trained model 32. The test data y_tε corresponds to the second input data relating to the technology of the disclosure.

The first determination section 64 derives a change amount C of the second output data relative to the first output data. In the present exemplary embodiment, an example is described in which an absolute value of the difference between a probability outputted from the trained model 32 as the first output data and a probability outputted from the trained model 32 as the second output data is employed as the change amount C. The first determination section 64 makes a determination as to whether the derived change amount C is not more than the pre-specified threshold TH. The first determination section 64 repeats this processing—reducing the perturbation amount ε from the preceding value thereof, obtaining second output data with the reduced perturbation amount ε, and determining whether the change amount C of the newly obtained second output data relative to the first output data is not more than the threshold TH—until the change amount C is not more than the threshold TH. How much the perturbation amount ε is reduced in this configuration may be specified beforehand and may be, for example, reduction by a pre-specified proportion (for example, 1%) of the preceding value of the perturbation amount ε.

The first output section 66 outputs (saves) information representing the test data y_t and perturbation amount ε, for which the change amount C has been determined by the first determination section 64 to be not more than the threshold TH, to the memory unit 22 to serve as the range data 34. In the present exemplary embodiment, the first output section 66 outputs a hypersphere to the memory unit 22 as the range data 34, in which the test data y_t is represented as a point in a space with the same number of dimensions as the test data y_t and the hypersphere is centered on that point with a radius of the perturbation amount ε. For example, if the test data y_t is a monochrome image (that is, an image in which each pixel has one of two values, 0 or 1) and the resolution of the image is 10 pixels by 10 pixels, the test data y_t may be represented as a point in space with 2×10×10 dimensions. The hypersphere can be considered to represent images for which change amounts of the output of the trained model 32 are small when perturbation amounts ε are applied.

The information processing device 12 carries out the processing described above on each of plural sets of different test data y_t. Thus, the range data 34 forms a union of plural hyperspheres obtained for the respective sets of different test data y_t. The information processing device 12 may shorten a computation duration by carrying out the processing described above for each of a plural number of sets of different test data y_t in parallel, with a pre-specified degree of parallelism. The degree of parallelism that is employed in this situation may be, for example, a number of cores of the CPU 20.

The range data 34 memorized in the memory unit 22 by the processing described above is sent from the information processing device 12 to the control device 14 and is memorized in the memory unit 42 of the control device 14. The first output section 66 may output (send) the range data 34 to the control device 14 via the network interface 25.

The second acquisition section 70 acquires image data imaged by the on-board camera 46 via the input/output interface 44. This image data is imaged by the on-board camera 46 at a pre-specified frame rate, for example, while an ignition switch of the vehicle in which the control device 14 is mounted is turned on. Below, this image data is referred to as actual data y_h. The actual data y_h corresponds to the third input data, to be inputted to the trained model 32, relating to the technology of the disclosure. The second acquisition section 70 corresponds to the acquisition section relating to the technology of the disclosure. In the present exemplary embodiment, the test data y_t and the actual data y_h have the same number of dimensions (that is, the numbers of bits in pixels and the number of pixels). If, however, the test data y_t and the actual data y_h have different numbers of dimensions, image processing may be applied to one or both of the test data y_t and the actual data y_h such that they have the same number of dimensions.

The second determination section 72 makes a determination as to whether the actual data y_h is contained in a range R of the perturbation amount ε measured from the test data y_t, which are represented by the information outputted by the first output section 66. More specifically, when the actual data y_h is represented as a point with the same number of dimensions as the actual data y_h, the second determination section 72 makes a determination as to whether this point is contained in the union of plural hyperspheres represented by the range data 34.

If the second determination section 72 determines that the actual data y_h is contained in the range R, the second output section 74 inputs the actual data y_h to the trained model 32. In response to this input, an identification result of an object included in the actual data y_h and a probability of the identification result are outputted from the trained model 32. Outputs from the trained model 32 are used in, for example, autonomous driving control of the vehicle.

On the other hand, if the second determination section 72 determines that the actual data y_h is not contained in the range R, the second output section 74 outputs (sends) the actual data y_h to the information processing device 12 via the network interface 43. The information processing device 12 treats the actual data y_h sent from the control device 14 as test data y_t. That is, the first determination section 64 conducts the determinations described above, using the actual data y_h outputted by the second output section 74 as the test data y_t. Then, the first output section 66 outputs information representing the actual data y_h and a perturbation amount ε, for which the change amount C has been determined by the first determination section 64 to be not more than the threshold TH, to the memory unit 22 as the range data 34. Thus, actual data y_h that is not contained in the range R is fed back from the control device 14 to the information processing device 12, and the range data 34 is updated on the basis of the fed back actual data y_h. Therefore, the reliability of output data that is obtained by inputting data to the trained model 32 may be evaluated.

The second output section 74 may output (save) actual data y_h that is not contained in the range R to the memory unit 42. In this case, the second output section 74 outputs the actual data y_h memorized in the memory unit 22 to the information processing device 12 with a pre-specified timing. For example, a periodic timing, times at which a number of sets of the actual data y_h memorized in the memory unit 42 exceeds a certain number, and the like can be mentioned as examples of the pre-specified timing. Further, when the second determination section 72 determines that actual data y_h is not contained in the range R, the second output section 74 may give a warning by one or both of a voice message and an indication on a display.

Figure 6:
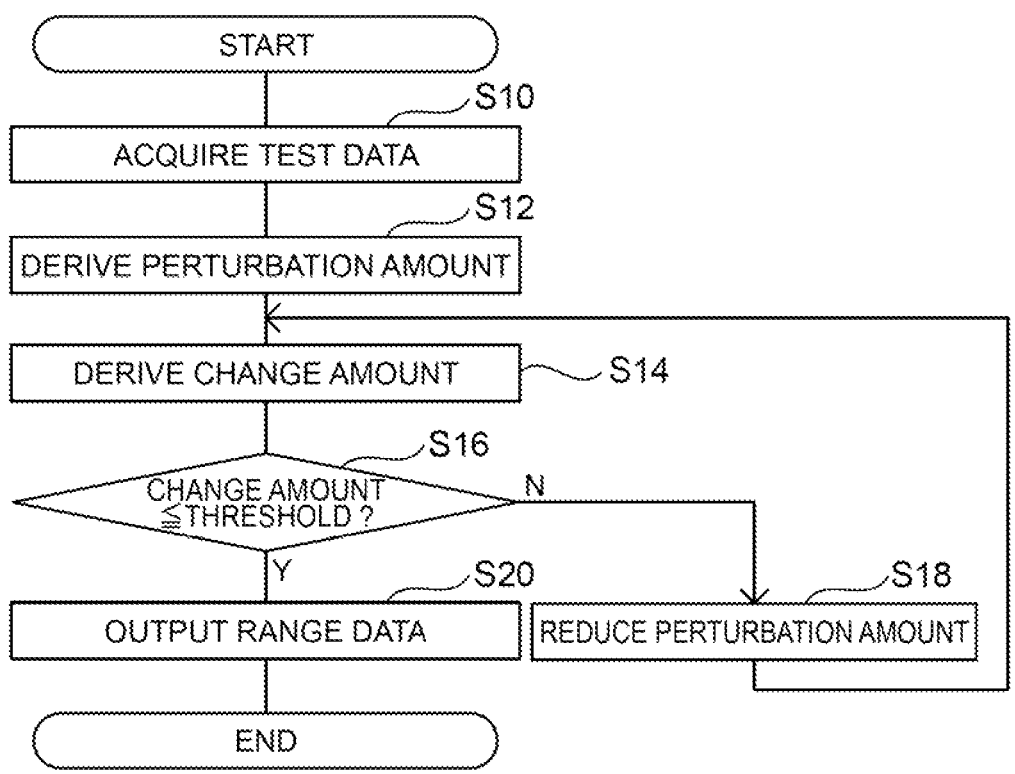
FIG. 6 is a flowchart showing an example of first output processing.

Now, operation of the information processing device 12 according to the present exemplary embodiment is described with reference to FIG. 6. First output processing, which is depicted in FIG. 6, is implemented by the CPU 20 of the information processing device 12 executing the information processing program 30. The first output processing is executed, for example, when an execution command is inputted by a user via the input unit 24. The first output processing is executed in parallel for each of a plural number of sets of test data y_t.

In step S10 of FIG. 6, the first acquisition section 60 acquires test data y_t. In step S12, in the manner described above, the derivation section 62 derives a perturbation amount ε of a perturbation to be applied to the test data y_t acquired in step S10.

In step S14, the first determination section 64 inputs the test data y_t acquired in step S10 to the trained model 32 and hence acquires first output data from the trained model 32. Further, the first determination section 64 inputs test data y_tε, in which a perturbation of the perturbation amount ε is applied to the test data y_t acquired in step S10, to the trained model 32 and hence acquires second output data from the trained model 32. When step S14 is initially executed, the perturbation amount ε is the perturbation amount ε derived in step S12. When step S14 is executed a second or subsequent time after step S18, which is described below, the perturbation amount ε is the perturbation amount ε that has been reduced in step S18. In the manner described above, the first determination section 64 derives a change amount C of the second output data relative to the first output data.

In step S16, the first determination section 64 makes a determination as to whether the derived change amount C is not more than the pre-specified threshold TH. If the result of this determination is negative, the processing advances to step S18. In step S18, the first determination section 64 reduces the perturbation amount ε to a value smaller than the value used in the preceding step S14. When the processing of step S18 is complete, the processing returns to step S14.

Alternatively, when the result of the determination in step S16 is affirmative, the processing advances to step S20. In step S20, the first output section 66 outputs information representing the test data y_t and perturbation amount ε, for which it has been determined in step S16 that the change amount C is not more than the threshold TH, to the memory unit 22 to serve as the range data 34. When the processing of step S20 is complete, the first output processing ends.

Figure 7:
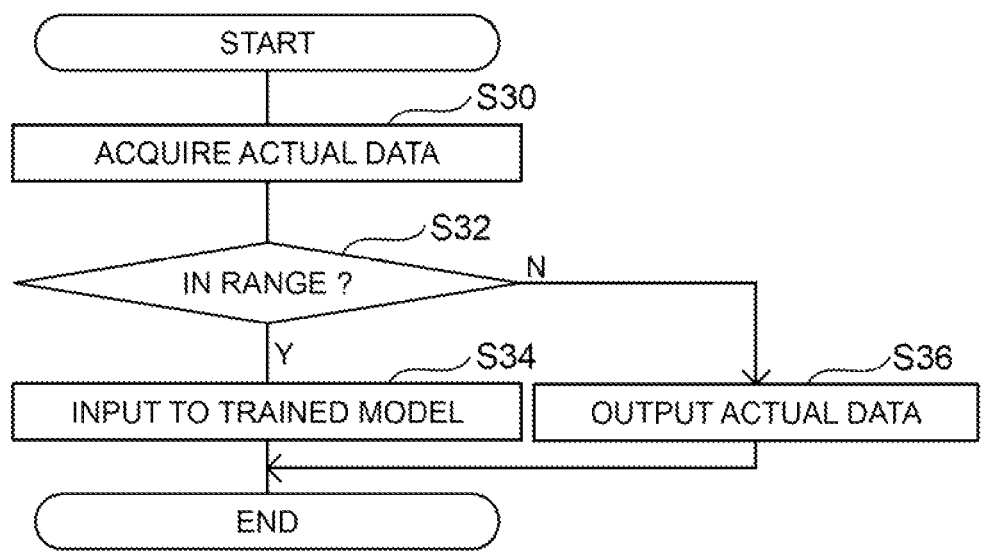
FIG. 7 is a flowchart showing an example of second output processing.

Now, operation of the control device 14 according to the present exemplary embodiment is described with reference to FIG. 7. Second output processing, which is depicted in FIG. 7, is implemented by the CPU 40 of the control device 14 executing the control program 50. The second output processing is executed, for example, each time image data imaged by the on-board camera 46 (actual data y_h) is inputted to the control device 14.

In step S30 of FIG. 7, the second acquisition section 70 acquires the actual data y_h imaged by the on-board camera 46 via the input/output interface 44. In step S32, in the manner described above, the second determination section 72 makes a determination as to whether the actual data y_h acquired in step S30 is contained in the range R of the perturbation amount ε measured from the test data y_t represented by the information outputted in step S20. If the result of this determination is affirmative, the processing advances to step S34, and if the result of the determination is negative, the processing advances to step S36.

In step S34, the second output section 74 inputs the actual data y_h acquired in step S30 to the trained model 32. In response to this input, an identification result of an object included in the actual data y_h and a probability of the identification result are outputted from the trained model 32. Outputs from the trained model 32 are used in, for example, autonomous driving control of the vehicle. When the processing of step S34 is complete, the second output processing ends.

In step S36, in the manner described above, the second output section 74 outputs the actual data y_h acquired in step S30 to the information processing device 12 via the network interface 43. When the processing of step S36 is complete, the second output processing ends.

As described above, according to the present exemplary embodiment, both computational complexity may be reduced and the reliability of output data obtained by inputting data to a trained model may be evaluated.

The derivation section 62 and the first determination section 64 of the exemplary embodiment described above may be configured as a single functional section. In this configuration, it is acceptable for this functional section to use, for example, the technique recited in the following Reference Document 2 to derive a maximum perturbation amount ε for which the change amount C is not more than the threshold TH.

Reference Document 2: Wong and Kolter, Provable defenses against adversarial examples via the convex outer adversarial polytope, (ICML2018).

The processing that is implemented by the CPU 20 and CPU 40 of the exemplary embodiment described above is described as software processing that is implemented by executing programs. However, each processing may be processing that is implemented by hardware such as an ASIC (Application-Specific Integrated Circuit), an FPGA (Field-Programmable Gate Array) or the like. Further, the processing executed by the CPU 20 and the CPU 40 may be processing that is implemented by a combination of both software and hardware. The information processing program 30 memorized in the memory unit 22 and the control program 50 memorized in the memory unit 42 may be recorded and distributed on various recording media.

The present disclosure is not limited by the above recitations. In addition to the above recitations, it will be clear that numerous modifications may be embodied within a technical scope not departing from the gist of the disclosure.

What is claimed is:

1. An information processing system comprising an information processing device and a control device, the information processing device including:
a first processor that is configured to make a determination as to whether each of a plurality of change amounts corresponding to each of a plurality of second output data relative to each of a plurality of first output data is not more than a pre-specified threshold,
the plurality of first output data being obtained from a trained model by input of a plurality of first input data to the trained model, the plurality of first input data being represented as a first set of points in a space with the same number of dimensions as the first input data, and the trained model being trained beforehand,
the plurality of second output data being obtained from the trained model by input of a plurality of second input data to the trained model, the plurality of second input data being represented as a second set of points in the space with the same number of dimensions as the second input data, and each second input data is obtained by applying a perturbation of a specified perturbation amount, for which the corresponding change amount is determined to be not more than the threshold, to the corresponding first input data such that the each second data is contained in a hypersphere whose radius is the specified perturbation amount and which is centered at a point representing the corresponding first input data;
obtaining a union of a plurality of hyperspheres each of which corresponds to the hypersphere that contains the each second data;
output the union of the plurality of hyperspheres as a range information,
and the control device including:
a second processor that is configured to acquire third input data to be inputted to the trained model;
make a determination as to whether the third input data is contained in the union of the plurality of hyperspheres represented by the range information outputted by the information processing device; and
output the third input data when the third input data is determined to be not contained in the union of the plurality of hyperspheres,
wherein
the first processor is configured to receive the third input data, which is determined to be not contained in the union of the plurality of hyperspheres, and make the determination thereof with the third input data being added to the plurality first input data such that the range information is updated in correspondence with the third input data being added to the plurality of the first data, and
the first processor is configured to output the third input data and a perturbation amount for which the corresponding change amount is determined to be not more than the threshold.

2. The information processing system according to claim 1, wherein the first processor is configured to repeat processing until each of the plurality of change amounts is not more than the threshold, the processing including,
when a change amount of the plurality of change amounts exceeds the threshold, reducing the perturbation amount from the preceding value thereof,
obtaining a new second output data with the reduced perturbation amount, and
making a determination as to whether a new change amount of the obtained new second output data relative to a first output data is not more than the threshold.

3. The information processing system according to claim 2, wherein
the information processing device includes a server computer,
the control device includes a computer mounted at a vehicle, and
the plurality of first input data, the plurality of second input data and the third input data are image data.

4. The information processing system according to claim 2, wherein the second processor is configured to acquire image data imaged by a camera mounted at the vehicle to serve as the plurality of first input data.

5. The information processing system according to claim 2, wherein the information outputted by the first processor is used in conducting autonomous driving control.

6. The information processing system according to claim 1, wherein
the information processing device includes a server computer,
the control device includes a computer mounted at a vehicle, and
the plurality of first input data, the plurality of second input data and the third input data are image data.

7. The information processing system according to claim 1, wherein the second processor is configured to acquire image data imaged by a camera mounted at the vehicle to serve as the plurality of first input data.

8. The information processing system according to claim 1, wherein the information outputted by the first processor is used in conducting autonomous driving control.

9. The information processing system according to claim 1, wherein the plurality of first input data and the plurality of second input data are image data with pixels representing coordinates of a point in the space with a number of dimensions equal to the number of pixels in the image data.

10. The information processing system according to claim 1, wherein the determination made by the first processor with respect to the plurality of first output data and the plurality of second output data is performed in parallel, with a pre-specified degree of parallelism.

11. The information processing system according to claim 1, wherein the second processor is configured to store the third input data when the third input data is determined to be not contained in the union of the plurality of hyperspheres in a memory and output the third input data at a specified timing.

* * * * *